United States Patent
Woodlief et al.

(10) Patent No.: US 10,639,669 B2
(45) Date of Patent: May 5, 2020

(54) ELECTRICALLY OPERATED PRESSURE CONTROL VALVE

(71) Applicant: NORDSON CORPORATION, Westlake, OH (US)

(72) Inventors: Robert J. Woodlief, Suwanee, GA (US); Peter W. Estelle, Peachtree Corners, GA (US)

(73) Assignee: Nordson Corporation, Westlake, OH (US)

( * ) Notice: Subject to any disclaimer, the term of this patent is extended or adjusted under 35 U.S.C. 154(b) by 0 days.

(21) Appl. No.: 16/354,080

(22) Filed: Mar. 14, 2019

(65) Prior Publication Data

US 2019/0283072 A1  Sep. 19, 2019

Related U.S. Application Data

(60) Provisional application No. 62/644,337, filed on Mar. 16, 2018.

(51) Int. Cl.
| | | |
|---|---|---|
| *B05C 11/00* | (2006.01) | |
| *B05C 5/00* | (2006.01) | |
| *B05C 5/02* | (2006.01) | |
| *B05C 11/10* | (2006.01) | |

(52) U.S. Cl.
CPC .......... *B05C 11/1013* (2013.01); *B05C 5/001* (2013.01); *B05C 5/0225* (2013.01); *B05C 11/1026* (2013.01)

(58) Field of Classification Search
CPC . B05C 11/1013; B05C 11/1026; B05C 5/001; B05C 5/0225
See application file for complete search history.

(56) References Cited

U.S. PATENT DOCUMENTS

| | | | | |
|---|---|---|---|---|
| 4,527,712 A * | 7/1985 | Cobbs, Jr. | ............... | B29B 7/325 222/1 |
| 4,779,762 A * | 10/1988 | Klein | ...................... | B05B 7/262 137/4 |
| 5,207,352 A * | 5/1993 | Porter | ................... | B05B 12/087 222/1 |
| 5,271,521 A * | 12/1993 | Noss | ..................... | B29C 48/022 222/1 |
| 5,332,125 A * | 7/1994 | Schmitkons | ...... | B01F 15/00175 222/1 |
| 6,517,891 B1 * | 2/2003 | Estelle | .................. | B05B 12/085 427/424 |
| 6,991,000 B2 * | 1/2006 | Jeter | ................... | B05C 11/1026 137/454.2 |

(Continued)

*Primary Examiner* — Frederick C Nicolas
(74) *Attorney, Agent, or Firm* — Baker & Hostetler LLP

(57) ABSTRACT

A hot melt dispensing system is described. The hot melt dispensing system includes a melter that melts solid material into hot melt, a pump that pumps the hot melt from the melter to at least one applicator, and a pressure control system that controls a pressure of pressurized air for operating the pump. The pressure control system includes a regulator assembly that controls the pressure of the pressurized air, and a drive component that actuates the regulator assembly. The hot melt dispensing system also includes a controller that determines a pressure setting for the pressurized air. The drive component receives the pressure setting from the controller and actuates the regulator assembly to a position associated with the pressure setting.

20 Claims, 12 Drawing Sheets

(56) References Cited

U.S. PATENT DOCUMENTS

| | | | |
|---|---|---|---|
| 10,046,351 B2* | 8/2018 | Brudevold | F04B 49/06 |
| 2014/0144933 A1* | 5/2014 | Estelle | B05C 11/1007 |
| | | | 222/23 |
| 2015/0028051 A1* | 1/2015 | Topf | B05C 11/1013 |
| | | | 222/1 |
| 2016/0193619 A1* | 7/2016 | des Jardins | B05B 12/087 |
| | | | 222/1 |
| 2018/0117622 A1* | 5/2018 | Estelle | B05C 11/1005 |

* cited by examiner

ELECTRICALLY OPERATED PRESSURE CONTROL VALVE

CROSS REFERENCE TO RELATED APPLICATIONS

This application claims the benefit of U.S. Provisional Patent App. No. 62/644,337, filed Mar. 16, 2018, the disclosure of which is hereby incorporated by reference herein.

TECHNICAL FIELD

The present disclosure generally relates to controls for hot melt dispensing systems, and more particularly relates to electrically operated pressure control valves for hot melt dispensing systems.

BACKGROUND

While automation has steadily increased in many technology spaces, a variety of machines still exist which require labor-intensive manual monitoring or adjustment. Even where some automation is present, it may be primitive, low-performance, or inefficient in comparison with other systems with which it interacts (e.g., causing a bottleneck or point of friction in a production line). In one example, hot melt dispensing systems include a variety of parameters which must be managed during operation. While a hopper or tank can be filled and a temperature of a melter set, other variables, such as system pressure, lack automation.

This lack of automation or remote control poses a number of drawbacks. It is inconvenient and expensive to staff operators to individual machines in a production line or other environments. Moreover, those operators are exposed to hazards which could be avoided if automation were available. Further, the accuracy and reliability of adjustments may be improved through the implementation of consistent algorithms utilized in machine control.

Non-automated controllers may be adjusted by an operator using a tool such as a hex wrench. This requires the operator to physically access the device and carry the appropriate tool to make the adjustment. The screw (or other element) with which the tool interacts can become worn or stripped and likewise more difficult to precisely adjust through continued use. Human adjustments are also susceptible to estimation or inexact setting. Even where some parameter references are present (e.g., numbered lines, clicks), a margin of error inheres in human operation—based on the operator's knowledge, judgment, and physical capabilities—which can add substantial variability to a process.

Some alternative controllers may be operated with an air pilot. While an air pilot may be used to reduce or remove human variability, other drawbacks exist. Air pilot controllers require inclusion of a line for clean air, thereby limiting their placement and mobility in a production environment while increasing maintenance burden and cost. Further, the performance of air piloted controllers (as measured by, e.g., linearity, resolution, hysteresis, and stiction) may be inferior to that of alternatives.

There is a need, therefore, for high-performance, automated pressure control systems which can be inexpensively integrated into new hot melt dispensing systems or inexpensively retrofitted to existing hot melt dispensing systems. With greater consistency and controllability, more precise "recipes" can be defined and utilized in production. Such recipes depend on carefully controlling pressure in addition to other product parameters. These parameters can be defined and followed automatically using high-performance, automated pressure control systems. These parameters can also be maintained or adjusted even when other parameters change, thereby increasing consistency in products. Thus, in addition to increasing performance, such solutions can also reduce costs, not only based on equipment or labor expenses but by reducing product defects resulting from variability.

SUMMARY

An embodiment of the present invention is a hot melt dispensing system that includes a melter configured to melt solid material into hot melt, and a pump configured to pump the hot melt from the melter to at least one applicator. The hot melt dispensing system also includes a pressure control system configured to control a pressure of pressurized air for operating the pump, where the pressure control system comprises a regulator assembly configured to control the pressure of the pressurized air, and a drive component configured to actuate the regulator assembly. The hot melt dispensing system also includes a controller configured to determine a pressure setting for the pressurized air, where the drive component is configured to receive the pressure setting from the controller and actuate the regulator assembly to a position associated with the pressure setting.

Another embodiment of the present invention is a hot melt dispensing system that includes a melter configured to melt solid material into hot melt, and at least one applicator configured to dispense the hot melt onto to a substrate. The hot melt dispensing system also includes a pump configured to pump the hot melt from the melter to the at least one applicator, and a pressure control system configured to control a pressure of the hot melt pumped by the pump, the pressure control system comprising a regulator assembly configured to control the pressure of the hot melt, and a drive component configured to actuate the regulator assembly. The hot melt dispensing system also includes a controller configured to determine a pressure setting for the hot melt, where the drive component is configured to receive the pressure setting from the controller and actuate the regulator assembly to a position associated with the pressure setting.

A further embodiment of the present disclosure is a method of dispensing a hot melt, the method comprising receiving solid material, melting the solid material into the hot melt, and pumping the hot melt to at least one applicator via a pump, wherein the pump is operated via pressurized air. The method also includes receiving pressure data associated with pressurized air for operating the pump, determining a pressure setting for the pressurized air based on the pressure data and automatically actuating a regulator assembly of a pressure control system to a position associated with the pressure setting in response to the pressure data, wherein the pressure control system is configured to control a pressure of the pressurized air.

Another embodiment of the present disclosure is a method of dispensing a hot melt, comprising melting solid material into the hot melt, pumping the hot melt to at least one applicator via a pump, determining a pressure setting for the hot melt based on the operation data, and automatically actuating a regulator assembly of a pressure control system to a position associated with the pressure setting, where the pressure control system is configured to control a pressure of the hot melt pumped by the pump.

BRIEF DESCRIPTION OF THE DRAWINGS

The accompanying drawings, which are incorporated in and constitute a part of this specification, illustrate embodiments of the disclosure and, together with a general description of the disclosure given above, and the detailed description of the embodiments given below, serve to explain the principles of the disclosure.

DETAILED DESCRIPTION

Aspects disclosed herein include automated pressure controls for hot melt dispensing systems 10, 10', 10". Specifically, electrically operated pressure control systems are described. These electrically operated pressure control systems can support remote adjustment, be simple to install and maintain, be low cost, can support diagnostics and display interfaces for setting and showing parameters, can support closed-loop control based on a variety of variables, and can support run-up or changes to the speed in different portions of a hot melt dispensing system 10, 10', 10". Adjustment resolution can also be increased along with other performance measures. Ultimately, the efficiency and consistency of melters or components thereof can be improved using the disclosed electrically operated pressure control valves.

Solutions disclosed herein can, but need not, achieve a closed-loop system. Feedback data can be used once or in a continuous or ongoing manner to allow recalculation or modification of parameters managed by the automated pressure controls. The feedback data can be provided from a device with which the automatic pressure control is coupled, or be provided from other systems or subsystems with which the device interacts (e.g., other parts of the hot melt dispensing systems 10, 10', 10"). For example, pressure feedback which diverges from a target pressure can be provided to an automated pressure control coupled with the hot melt dispensing system 10, 10', 10". The automated pressure control can calculate a new pressure setting based on the pressure feedback from the associated hot melt dispensing system 10, 10', 10", then communicate the new pressure setting (or an associated command) to mechanical components and interfaces to control the hot melt dispensing system 10, 10', 10" according to that pressure setting. In an alternative embodiment, the feedback data may be a speed change in an upstream or downstream component of the hot melt dispensing system 10, 10', 10", which then allows calculation of a new pressure setting to support the overall system speed. These examples are provided for purpose of explanation only, and are not exhaustive or exclusive in view of the disclosures herein.

While some embodiments herein describe use of a piston pump or gear pump with a melter, such descriptions should not be deemed limiting in terms of the applicability of the controllers disclosed herein. For example, the electrically operated pressure control valves disclosed can be used with, e.g., melter systems with or without parallel recirculation paths, melter systems using gerotor pumps, melter systems using phased piston pumps, other continuously driven systems, etc. Moreover, aspects herein can be implemented with other systems beyond hot melter systems without departing from the scope or spirit of the innovation.

Figure 1:
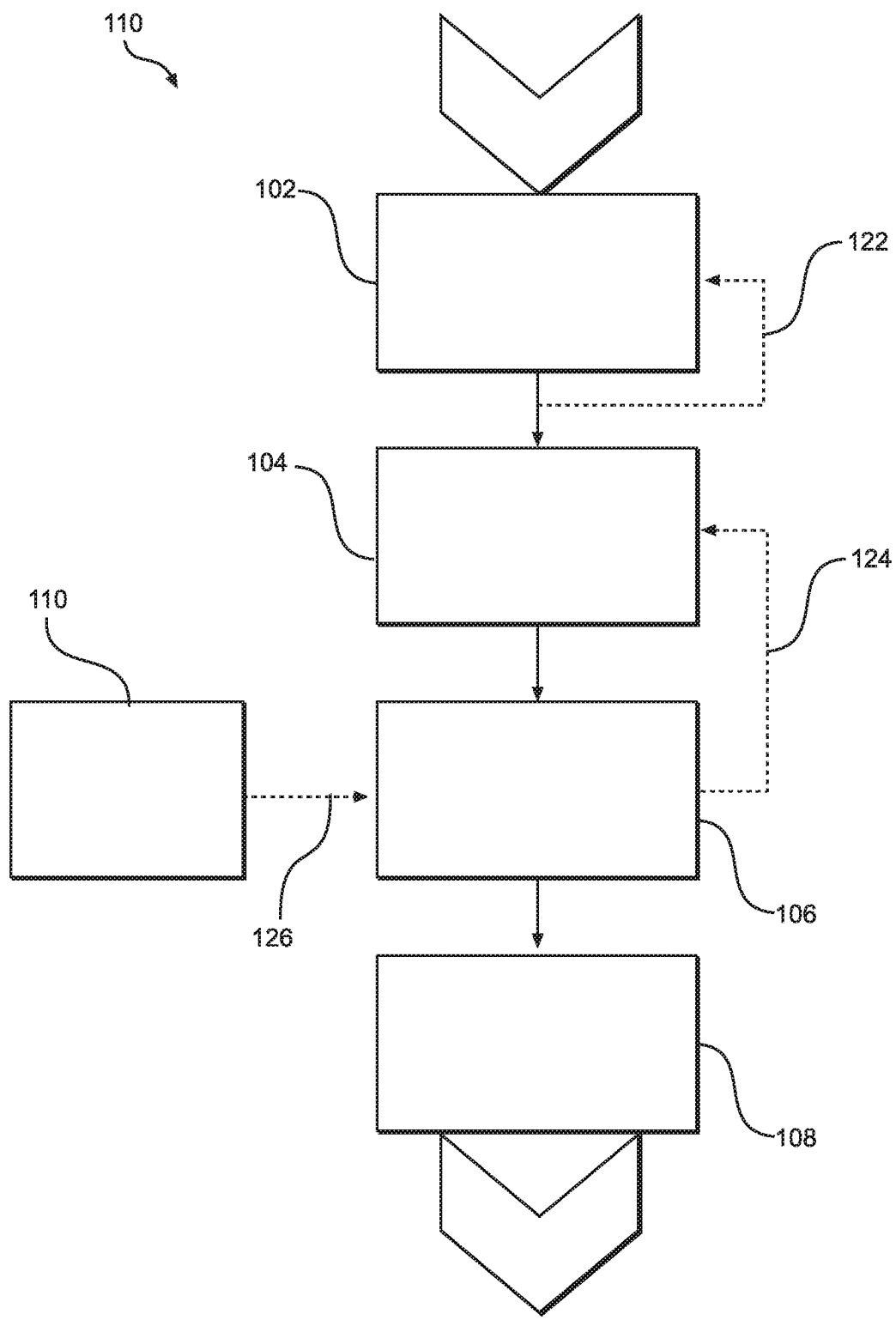
FIG. 1 is a block diagram of an example production line system with which aspects herein can be implemented.

FIG. 1 provides context for how electrical control can be achieved. FIG. 1 illustrates a block diagram of a system 100 representing various control and feedback mechanisms in a production line or similar environment. The system 100 includes a device 102, a device 104, a device 106, and a device 108, as well as an entity 110. Each of the devices 102, 104, 106, and 108 can be a hopper 250, 350, 450, a melter 254, 354, 454, or a pump 258, 358, 458, as will be described below. Further, the entity 110 can be a controller 262, 362, 462, which will also be described below. The system 100 is illustrated for ease of explanation and alternative embodiments of the system 100 may include more or fewer devices and other elements, as well as branches or paths separate from, parallel to, or only partially coincident with those illustrated in the system 100.

The devices 102, 104, 106, and 108 can be controlled in various manners. Control can include powering a device up or down, changing the device's speed, or changing other parameters. Control can be manual, semi-automatic, or automatic depending on the capabilities and implementation of a device. Regardless of how devices are controlled, they may coordinate their function and capacity with other devices to ensure smooth and successful flow through the system 100. Control and coordination can occur through direct input or various feedback loops. Other control techniques can be implemented without departing from the scope or spirit of the innovation.

In the example system shown, and in one type of control, the device 102 receives feedback using a feedback path 122 for control based on its own performance. In this type of feedback control, the device 102 can confirm its outputs or that its parameters accord with the settings or targets, and adjust based on discovery of deviations through the feedback path 122.

In an example of another type of control, the device 104 receives feedback using a feedback path 124 for control based on the performance of the device 106. The device 106 receives information from the entity 110 via feedback path 126. In this type of feedback control, the device 104 can determine its settings based on the performance of the device 106 (or information on inputs received by the device 106 from the entity 110 or otherwise which directly or indirectly reflect the performance of the device 104).

In an example of another type of control, the device 106 receives control input directly from an entity 110. The entity 110 can be a centralized or decentralized controller or computer receiving automatic, semi-automatic, or manual input, which can be arbitrary or based on data received or collected from any element of the system 100 or other systems (e.g., a sales subsystem may throttle production based on orders).

The device 108 receives no control input or feedback, but may be set or managed in various other manners. In an embodiment, feed-forward controls can push information from an upstream device to a downstream device, or other techniques can be provided. Regardless, in lines containing multiple devices or machines, their settings can be provided individually for a coordinated effort to provide the desired throughput, increased efficiency, and reduced defects. The device 102 is configured to avoid producing components or pushing work in progress faster than the device 104 can perform the next step (without establishment of a holding area or split in the line); and the device 106 can be configured to avoid demanding work in progress from the device 104 according to parameters which are faster than the device 104 can complete its work while controlling defects.

One or more of the devices 102, 104, 106, and 108 can include a melter. Melters can receive solid or liquid materials from a tank or supply and convey the materials through various heating elements (e.g., to or over a heated grid; to or through a heated hose) to cause the materials to become free-flowing (or maintain the materials in a free-flowing state). A pump can convey the free-flowing materials through a manifold or other conduit to attachments for applying the free-flowing, molten material. These and additional aspects of hot melt dispensing systems 10, 10', 10" will be described further below, particularly in relation to FIGS. 2D, 3D, and 4D.

Figure 2A:
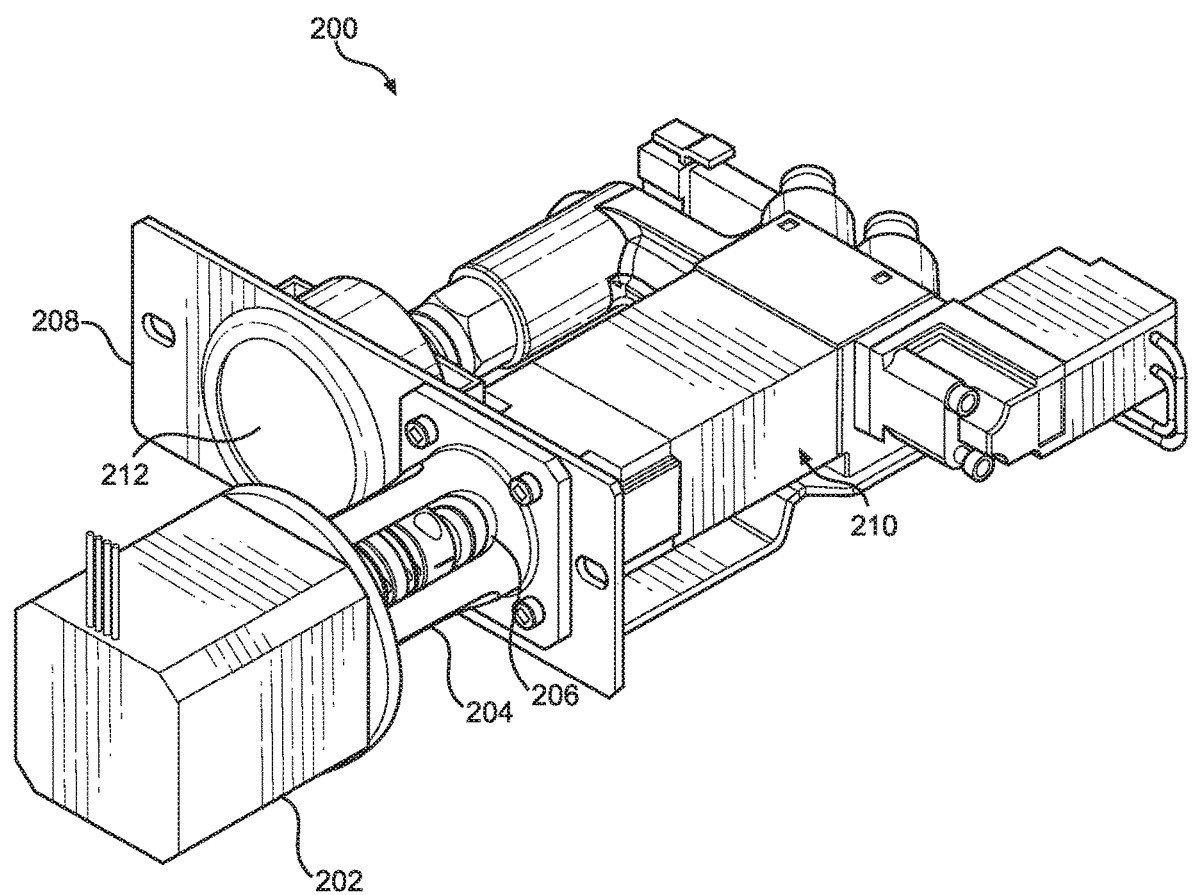
FIG. 2A is a perspective view of an embodiment of a pressure control system disclosed herein.
Figure 2B:
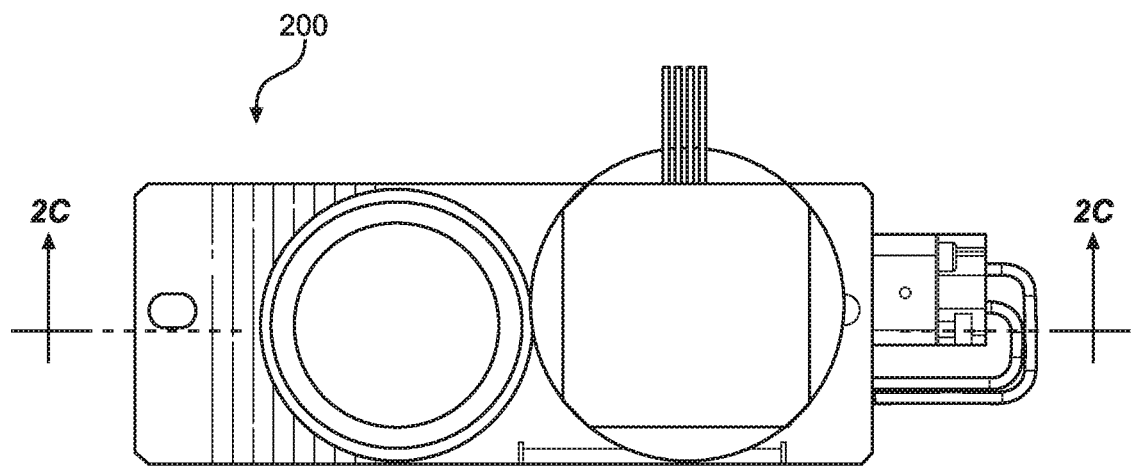
FIG. 2B is a side view of the pressure control system shown in FIG. 2A.
Figure 2C:
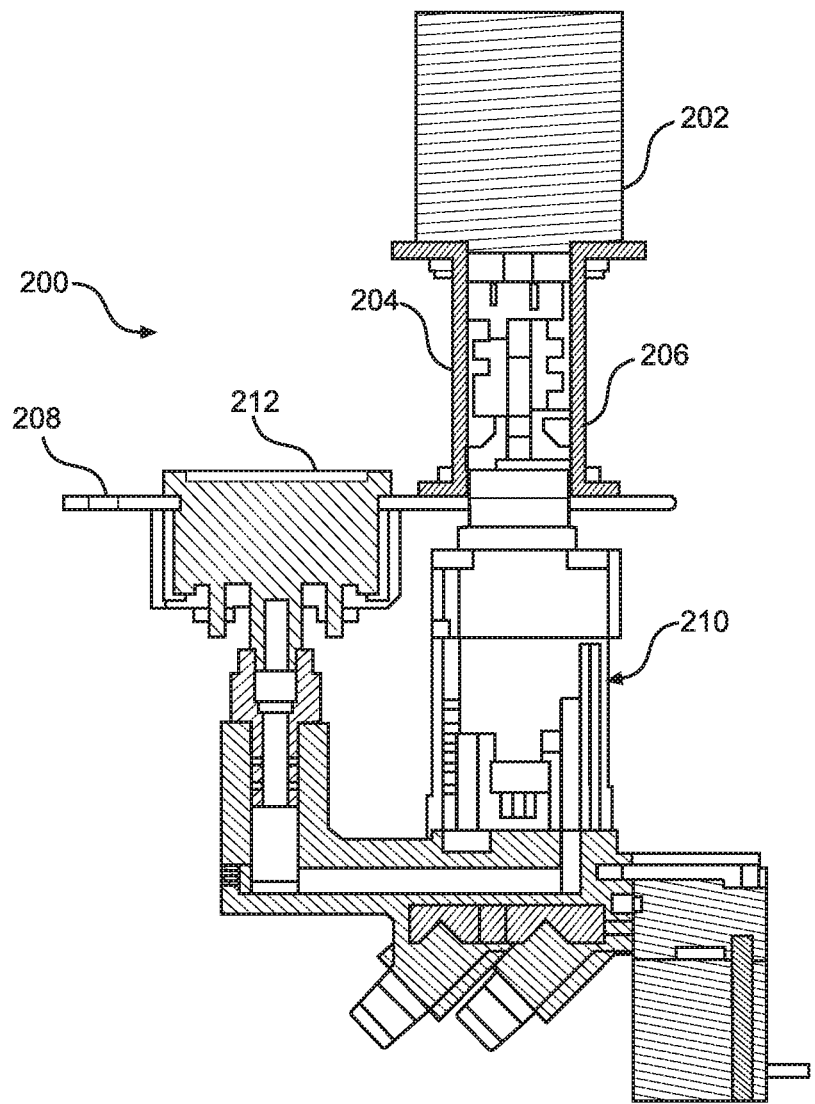
FIG. 2C is a cross-sectional view of the pressure control system shown in FIG. 2A.
Figure 2D:
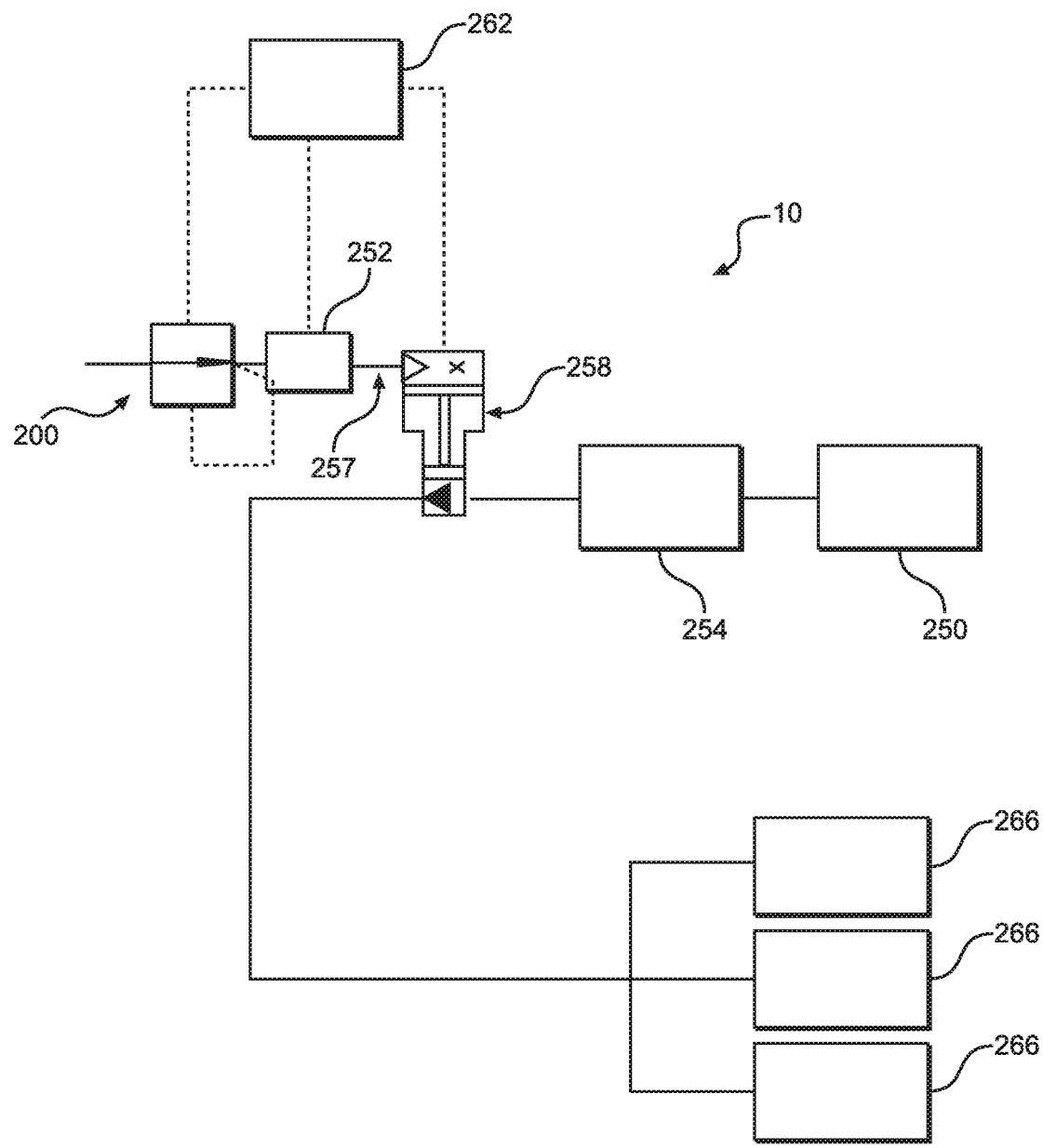
FIG. 2D is a schematic view of a hot melt dispensing system including the pressure control system shown in FIG. 2A.

Various pressure controls and other controls herein can be provided information according to the techniques described with respect to FIG. 1, as well as others. With this foundation, FIGS. 2A-2C illustrate a pressure control system for making automated pressure adjustments to pressurized air provided to a pump 258, which can be a piston pump, as will be described below. FIG. 2D illustrates a schematic diagram of a hot melt dispensing system 10 utilizing pressure control system 200 with pump 258.

The pressure control system 200 is configured to control the pressure of pressurized air for operating the pump 258. The pressure control system 200 includes a coupling 204, a mounting bracket 206, a faceplate 208, a regulator assembly 210 configured to control the pressure of the pressurized air, a motor 202 (also referred to as a drive component) configured to actuate the regulator assembly 210, and a pressure sensor 212. The motor 202 can be a stepper motor, or another type of motor. The regulator assembly 210 or portions of the pressure control system 200 distal thereto can include a solenoid and/or other components.

In alternative embodiments, the pressure control system 200 can be an add-on to an existing pressure control and pressure gauge of a melter that includes a piston pump that does not require removal of existing controls or gauges. In embodiments, the coupling 204 provides an external hex or other keyed interface which operatively couples with an internal hex or mating keyed interface of such a pressure control. In this fashion, existing pressure control subsystems using manual tool interfaces can be retrofitted for use with the pressure control system 200.

FIG. 2D illustrates a schematic diagram of the pump 258, melter 254, and the pressure control system 200 utilized in the hot melt dispensing system 10. The hot melt dispensing system 10 includes a hopper 250 configured to store solid material. The hopper 250 can take any number of forms, but in one embodiment the hopper 250 can include a large storage tote configured to store solid material such as pelletized adhesive for periodic delivery to the melter 254. The hot melt dispensing system 10 can include a solids pump (not shown) and a hose extending from the hopper 250 to the melter 254. The solids pump can include a pneumatic pump having an eductor and/or a venturi to move the solid material from the hopper 250 with pressurized air through the hose to the melter 254. It will be understood that the solids pump may include other types of feeding mechanisms, including non-pneumatic forms of feeding such as a mechanical agitator. The hopper 250 may be repositioned in relation to the melter 254, such as a further distance or adjacent to the melter 254. In other embodiments, the hopper 250 may be an on-board component of the melter 254, such that the hopper 250 is connected to or integrated with the melter 254.

Continuing with FIG. 2D, the hopper 250 delivers the solid material to the melter 254. The melter 254 can function to store a small amount of solid material for melting on demand as needed for dispensing. The melter 254 can include a heating device configured to receive the solid material from the hopper 250 and subsequently melt the solid material into the hot melt. In one embodiment, the heating device can include an inductor/susceptor-type heating device for rapidly melting the adhesive on demand for dispensing from the one or more applicators 266. The manifold of the melter 254 can include passages for receiving the hot melt from the heating device and conveying the hot melt to the pump 258. The pump 258 can be disposed within the manifold of the melter 254, or externally to the melter 254. The pump 258 is configured to pump the supply of hot melt from the melter 254, particularly the heating device of the melter 254, through hoses, and to the applicators 266. The applicators 266 can include any type of known applicators 266 used to dispense various types of hot melt onto a substrate. In one example, one or more of the applicators 266 can be jetting modules. As such, the applicators 266 can include respective valve members that rapidly open and close against a valve seat to rapidly jet minute droplets of the hot melt from the applicators 266. It will be appreciated that the applicators 266 can define other types of dispensing applicators, including similar and different types of contact or non-contact nozzles/modules, without departing from the scope of the invention. Though three applicators 266 are shown, the hot melt dispensing system 10 can include any number of applicators 466 as desired.

The pressure control system 200 is operatively coupled with the pump 258 to assist with control of the flow of hot melt from the pump 258 through pressure regulation of pressurized air used to actuate the pump 258. In particular, the pressure control system 200 can be connected to the pump 258 through a hose 257 configured to direct pressurized air to the pump 258. The hot melt dispensing system 10 can include a controller 262 (shown schematically in FIG. 2D). In embodiments, the controller 262 can be a feedback controller. The controller 262 may be integral to the pressure control system 200, or may be arranged on a circuit board or other electronic component remote to the pressure control system 200. The controller 262 can include one or more of a circuit or circuits, memory, a processor, or other elements capable of completing logical processes for generating an output based on an input. The pressure control system 200 can further comprises a circuit board, and the controller 262 can be implemented on the circuit board. The controller 262 can be in wired and/or wireless communication with the pressure control system 200, a pressure sensor 252, the pump 258, and/or any other components of the hot melt dispensing system 10. The controller 262 receives pressure data from the pressure sensor 252, an upstream or downstream device in the hot melt dispensing system 10 (of which the pressure control system 200 is a part), and/or a user or system. The pressure sensor 252 can be any type of sensor capable of detecting the pressure or any other characteristic of the pressurized air flowing through the pressure control system 200 to the pump 258. As such, the pressure sensor 252 can be in communication with the pressurized air via the hose 257 between the pressure control system 200 and the pump 258.

The controller 262 can be configured to receive the pressure data associated with the pressurized air from the pressure sensor 252 and calculate a pressure setting for the regulator assembly 210 of the pressure control system 200 to control the pressurized air based on the pressure data. The controller 262 can determine the pressure setting to match the pressure within the pump 258 to the particular mode of operation, process demands, situational variances, etc. The motor 202 of the pressure control system 200 is configured to receive the pressure setting from the controller 262 and actuate the regulator assembly 210 to a position associated with the pressure setting in response to the pressure data. In one embodiment, the motor 202 can be configured to rotate a component of the regulator assembly 210. In embodiments, feedback can be continuously received and updated by the controller 262 from the pressure sensor 252 to confirm the pressure of pressurized air provided to the pump 258 responds to the control, and further adjustments can be solved for by the controller 262 and provided when the solved or target pressure is not achieved with a first adjustment. In alternative or complementary embodiments, a pressure tolerance or threshold (e.g., 0.1 bar, 0.01 bar, any other number) can be determined as a minimum adjustment. The controller 262 can compare a requested adjustment to the tolerance or threshold, and pause or reject adjustments until a solved or requested adjustment is greater than the minimum adjustment. In an example, the pressure sensor 252 may provide feedback to the controller 262 that the pressure of pressurized air provided to the pump 258 is increasing, or the pressure control system 200 may itself detect a pressure increase (in the latter case, developing its data internally rather than relying on other portions of the hot melt dispensing system 10), based on operating variances, beginning a new task, changing tasks, et cetera. The feedback is passed to the controller 262, which determines whether the pressure is changing or changed and calculates an adjustment to be implemented to the pressure control 200 as a function of the position of the motor 202 and the regulator assembly 210. This adjustment is then used to generate a command or perform other action to actuate the motor 202 until it is driven to the calculated adjustment.

In another example, an upstream or downstream device may provide a notification or instruction that a rate of operation of the hot melt dispensing system 10 is increasing or decreasing. In still another example, an operator or other system (e.g., computer remote to the hot melt dispensing system 10) can provide a pressure setting (arbitrarily or based on information). As such, the controller 262 can include a user interface for receiving manual input from an operator. In either example the controller 262 receives this information and determines or solves for a pressure setting based on the information, and commands the motor 202 to drive to a position associated with the pressure setting.

Various inputs can be provided to or discovered by the pressure control system 200 for use by the controller 262. These can include, but are not limited to, a hot melt material, a hot melt task, a hot melt dispensing rate, the number of hoses or guns attached to a melter 254, a temperature, an environmental factor (e.g., air pressure, humidity), a safety condition, adjacent device condition (e.g., within a production line), a production line speed, etc.

Figure 3A:
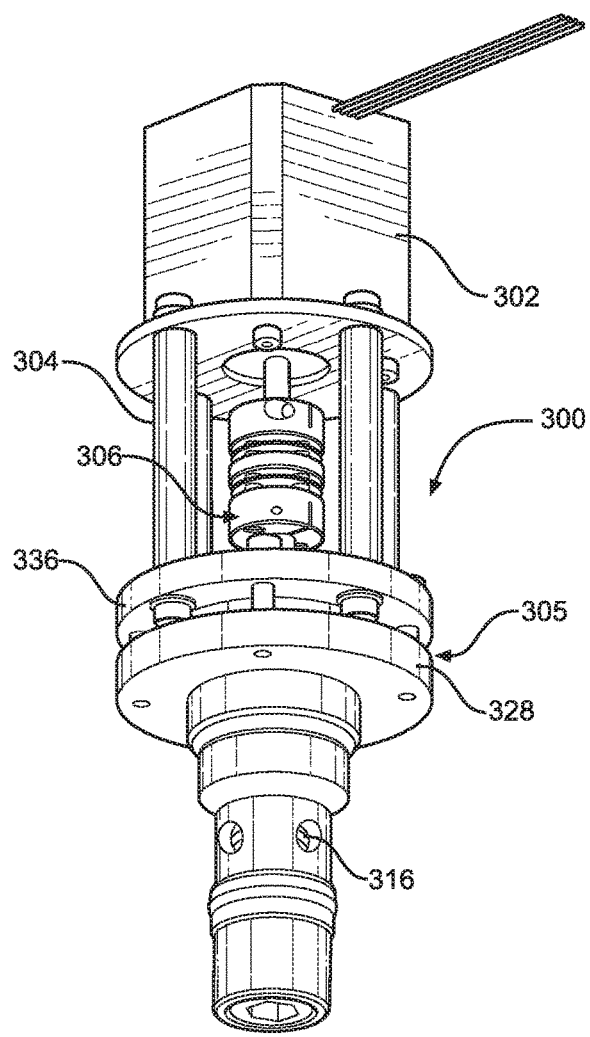
FIG. 3A is a perspective view of another embodiment of a pressure control system disclosed herein.
Figure 3B:
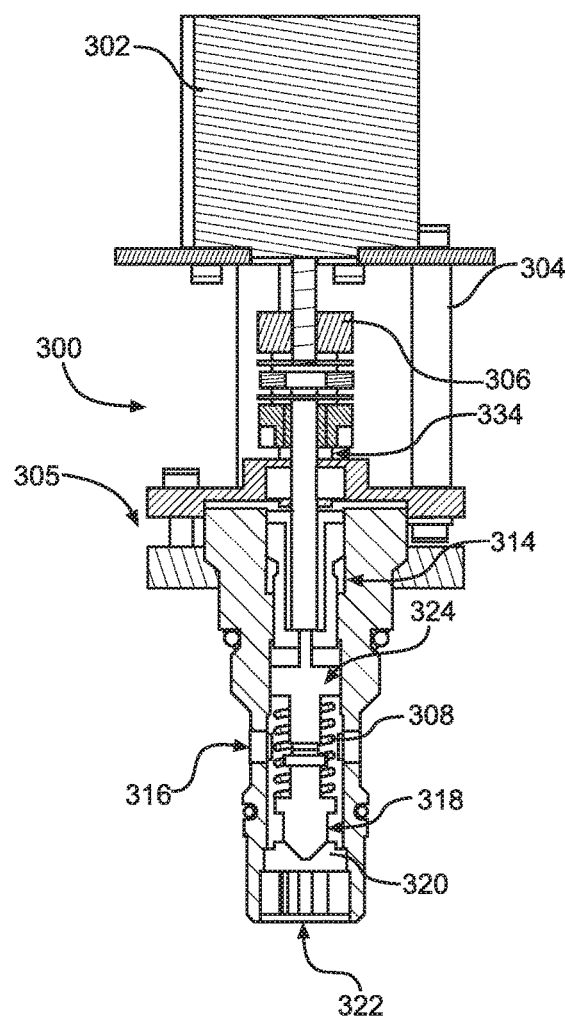
FIG. 3B is a cross-sectional view of the pressure control system shown in FIG. 3A.
Figure 3C:
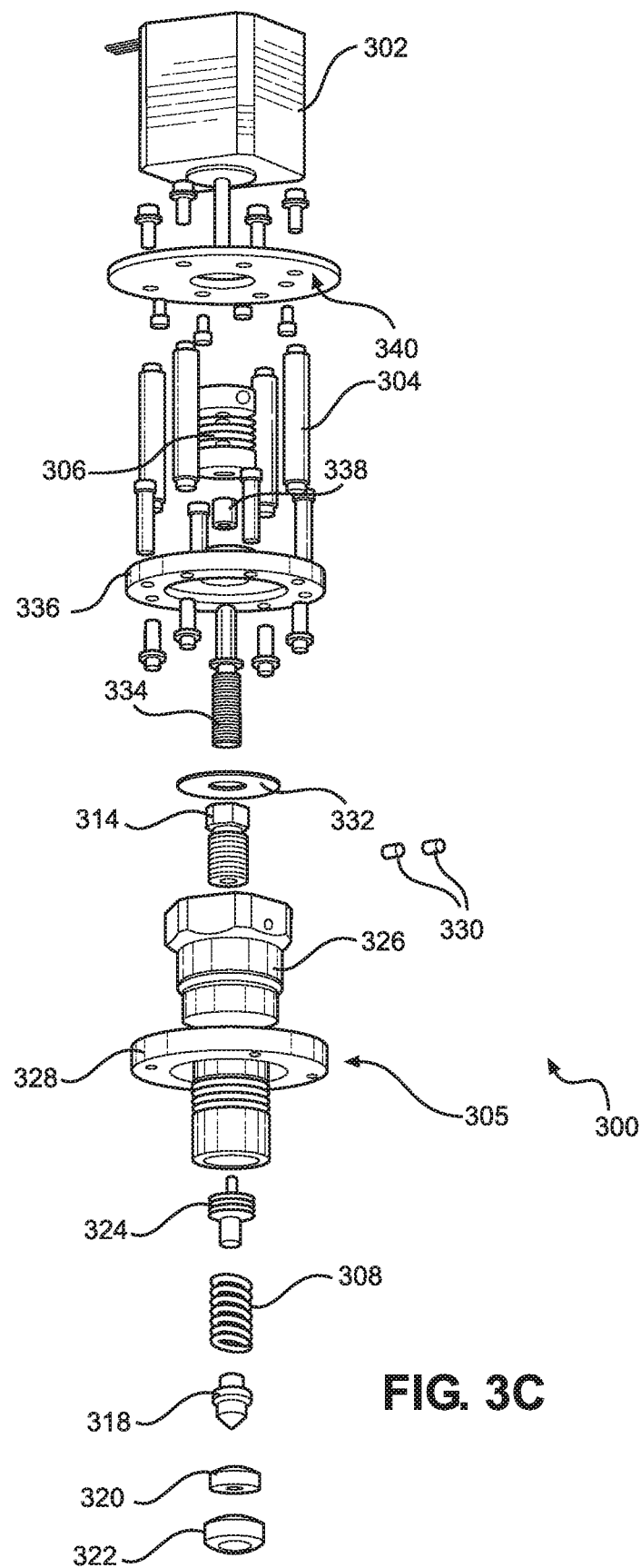
FIG. 3C is an exploded view of the pressure control system shown in FIG. 3A.
Figure 3D:
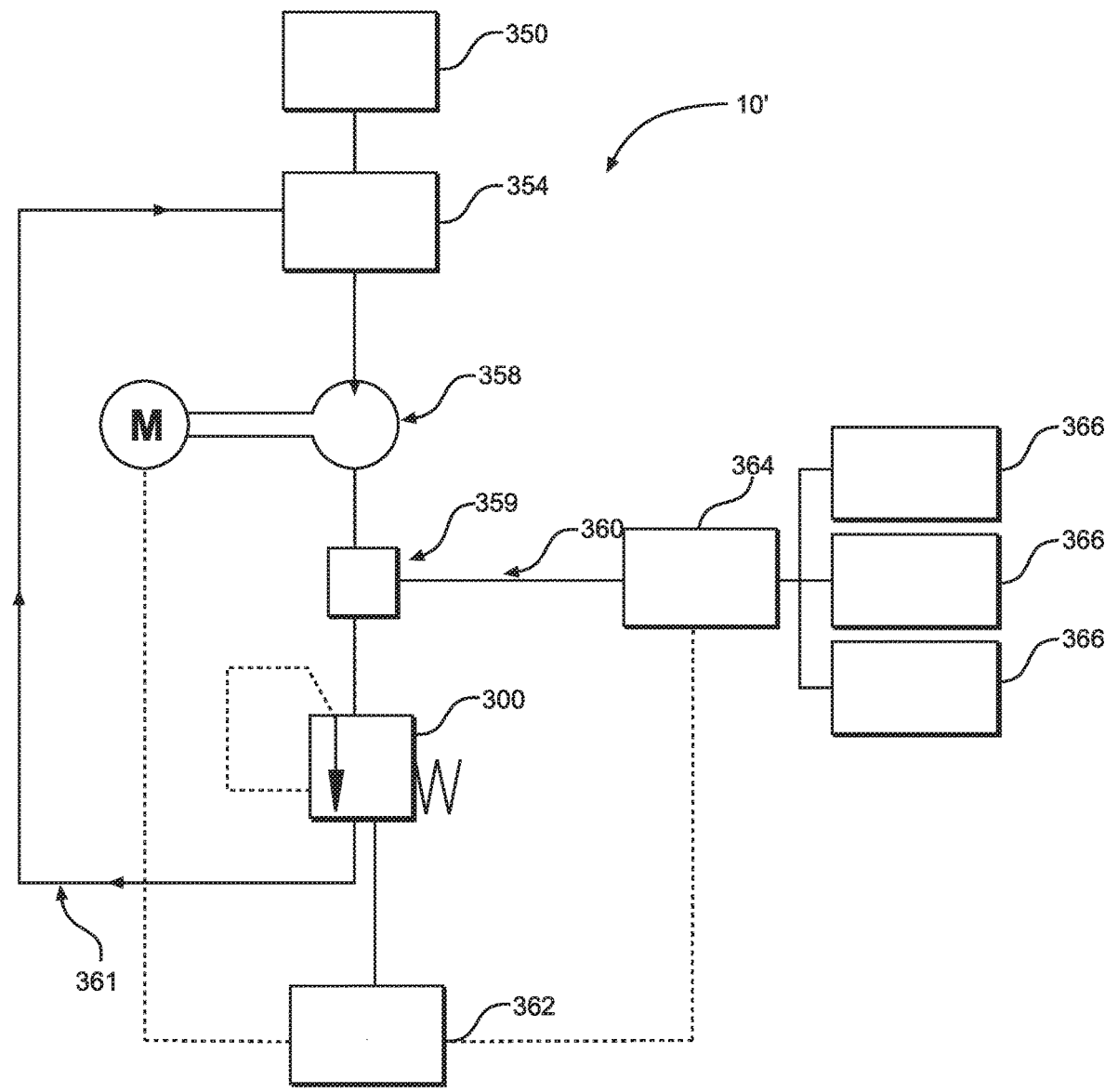
FIG. 3D is a schematic view of a hot melt dispensing system including the pressure control system shown in FIG. 3A.

Now referring to FIGS. 3A, 3B, and 3C, another embodiment of a pressure control system 300 for providing automated pressure adjustments in hot melt dispensing systems 10' is depicted. FIG. 3D illustrates a schematic diagram showing a hot melt dispensing system 10' utilizing a pressure control system 300.

The pressure control system 300 includes a motor 302 (also referred to as a drive component), a spacer assembly 304, and a regulator assembly 305. The regulator assembly 305 of the pressure control system 300 can include a clamp 306, a pressure spring 308, a pressure set screw 314, a needle 318, a seat 320, a lock 322, a piston 324, a valve body 326 (having apertures 316), body clamp halves 328 and 336, set hardware 330 (which can be, e.g., screws, pins, bindings, etc.), a pressure tag 332, an adjustment screw 334, a sleeve 338, and a mount assembly 340. The regulator assembly 305 and its constituent components can be configured to control the pressure of the hot melt flowing through the hot melt dispensing system 10'. Specifically, the piston 324 can move axially to apply a varying degree of load to the pressure spring 308, which is configured to apply a force to the needle 318 at an end opposite the piston 324. When hot melt flows through the regulator assembly 305, hot melt can apply a force to the needle 318 in a direction opposite the force applied by the pressure spring 308, thus forcing the needle 318 upwards and allowing the hot melt to flow through the regulator assembly 305 between the needle 318 and the seat 320. The motor 302 can be a stepper motor or another type of motor, and can be configured to actuate the regulator assembly 305. Specifically, the motor 302 can rotate the adjustment screw 334 operably attached to the piston 324, which likewise axially moves the piston 324 and adjusts the force applied to the spring 308 by the piston 324. By adjusting this force, the motor 302 can control the force required by the hot melt to move the needle 318, and thus the pressure at which hot melt flows through the regulator assembly 305.

The spacer assembly 304 includes various posts and hardware for arranging the motor 302 distal to the valve of the pressure control system 300. The mount assembly 340 includes a mount plate and associated hardware for coupling the mount plate to the spacer assembly 304. The clamp 306 and sleeve 338 form a coupling to operatively couple the drive of the motor 302 to the pressure set screw through the adjustment screw 334. As with other embodiments, the sleeve 338 and/or the adjustment screw 334 can be keyed or matched to the pressure set screw or other elements, or alternatively formed together or attached in other manners. The body clamp halves 328 and 336 include associated hardware for coupling the body clamp halves 328 and 336 with one another and the spacer assembly 304.

FIG. 3D illustrates a schematic diagram of the melter 354 and the pressure control system 300 utilized in the hot melt dispensing system 10'. Though labeled differently, various elements of the hot melt dispensing system 10' can be similar to corresponding aspects of the hot melt dispensing system 10 and are described as such. The hot melt dispensing system 10' includes a hopper 350 configured to store solid material. The hopper 350 can take any number of forms, but in one embodiment the hopper 350 can include a large storage tote configured to store solid material such as pelletized adhesive for periodic delivery to the melter 354. The hot melt dispensing system 10' can include a solids pump (not shown) and a hose extending from the hopper 350 to the melter 354. The solids pump can include a pneumatic pump having an eductor and/or a venturi to move the solid material from the hopper 350 with pressurized air through the hose to the melter 354. It will be understood that the solids pump may include other types of feeding mechanisms, including non-pneumatic forms of feeding such as a mechanical agitator. The hopper 350 may be repositioned in relation to the melter 354, such as a further distance or conversely adjacent to the melter 354. In other embodiments, the hopper 350 may be an on-board component of the melter 354, such that the hopper 350 is connected to or integrated with the melter 354.

Continuing with FIG. 3D, the hopper 350 delivers the solid material to the tank disposed within the melter 354. The tank can function to store a small amount of solid material for melting on demand as needed for dispensing. A heating device disposed within the melter 354 can be configured to receive the solid material from the tank, and subsequently melt the solid material into the hot melt. In one embodiment, the heating device can include an inductor/susceptor-type heating device for rapidly melting the adhesive on demand for dispensing from the one or more applicators 366. The melter 354 can include passages for receiving the hot melt from the heating device and conveying the hot melt to various hoses. The pump 358 can be disposed within the melter 354 or external to the melter 354, and is configured to pump the supply of hot melt from the melter 354, particularly the heating device of the melter 354, through hoses, and to the applicators 366. The pump 358 can be a gear pump, though other types of pumps are contemplated. The applicators 366 can include any type of known applicators 366 used to dispense various types of hot melt onto a substrate. In one example, one or more of the applicators 366 can be jetting modules. As such, the applicators 366 can include respective valve members that rapidly open and close against a valve seat to rapidly jet minute droplets of the hot melt from the applicators 366. It will be appreciated that the applicators 366 can define other types of dispensing applicators, including similar and different types of contact or non-contact nozzles/modules, without departing from the scope of the invention. Though three applicators 366 are shown, the hot melt dispensing system 10' can include any number of applicators 366 as desired.

The pump 358 can pump the hot melt to a flow divider 359 that is configured to receive the hot melt from the pump 358 and split the hot melt between an applicator flow path 360 that extends to the applicators 366 and a recirculation path 361 that recirculates the hot melt to the pump 358. The pressure control system 300 in the hot melt dispensing system 10' can be positioned in the recirculation path 361. Each of the applicator flow path 360 and the recirculation path 361 can comprise one or more hoses configured to direct the flow of hot melt. In one embodiment, when the applicators 366 are dispensing the hot melt, a percentage of the hot melt may flow through the recirculation path 361, while the remainder of the hot melt flows through the applicator path 360 to the applicators 366. However, when the applicators 366 are not dispensing the hot melt, the entirety of the hot melt flow can flow through the recirculation path 361.

The pressure control system 300 may include a circuit board or electronic components integrally (e.g., within the housing of the motor 302) or remotely (e.g., not physically in contact with the pressure control system 300) and be configured to control the flow of hot melt pumped by the pump 358 to the applicators 366 via the applicator flow path 360 through pressure regulation of the hot melt flowing through the recirculation path 361. The hot melt dispensing system 10' can include a controller 362 for receiving pressure data and generating an output to the pressure control system 300 based on an input received. In embodiments, the controller 362 can comprise a feedback controller. The circuitry may also include logic for implementing, or the electronic components may also comprise memory for storing, the controller 362 for determining pressure settings based on pressure data (or other inputs) and determining motor actuation or position based on pressure settings.

In operation, the pressure control system 300 determines or receives pressure data (e.g., feedback information, feedforward information, control instructions) from itself, a pressure sensor 364, or another device or source. The pressure sensor 364 can be a device, such as a hydraulic pressure transducer, that is configured to collect pressure data on the hot melt and provide the pressure data to the controller 362. In the depicted embodiment, the pressure sensor 364 is located in the applicator flow path 360, though other positions for the pressure sensor 364 are contemplated. Based on the pressure data, a pressure setting is determined by the controller 362. The controller 362 compares the determined pressure setting to a current or projected pressure. If the current or projected pressure deviates from the pressure setting (e.g., in any measurable amount, by more than a tolerance or threshold, or according to other comparisons), the controller 362 (or other logic) can determine an adjustment to establish the desired pressure setting in the system. As a result, the controller 362 is configured to receive the pressure data and determine a pressure setting for the hot melt based on the pressure data.

The pressure setting is described in terms of a pressure control setting, and the motor 302 of the pressure control system 300 is driven to arrange components of the regulator assembly 305, in particular the pressure set screw 314, the pressure spring 308, and the piston 324, to the desired setting. As such, the motor 302 can receive the pressure setting from the controller 362 and drive and/or rotate components of the regulator assembly 305 to a position associated with the pressure setting in response to the pressure data. In embodiments, feedback can be continuously received and updated by the controller 362 from the pressure sensor 364 to confirm the pressure of the hot melt responds to the control, and further adjustments can be solved for by the controller 362 and provided when the solved or target pressure is not achieved with a first adjustment. In alternative or complementary embodiments, a pressure tolerance or threshold (e.g., 0.1 bar, 0.01 bar, any other number) can be determined as a minimum adjustment. The controller 362 can compare a requested adjustment to the tolerance or threshold, and pause or reject adjustments until a solved or requested adjustment is greater than the minimum adjustment.

The pressure control system 200 and/or the pressure control system 300 can include additional components in various embodiments. For example, position sensors can be used in conjunction with motors or pressure setting elements to allow for more precise control and minimize the need for calibration, testing, or maintenance. In another example, circuits or memory of pressure controls can include pre-saved settings or store settings solved. In embodiments the pressure control system 200 and/or the pressure control system 300 can include pressure sensors, flow sensors, or other sensors, which can provide feedback or operation data for use by other components.

Additionally, in other embodiments, the hot melt dispensing system 10' may not include the pressure sensor 364. In such embodiments, the controller 362 can be configured to instruct the motor 302 to actuate so as to achieve pressure settings within the pressure control system 300 without receiving feedback from an external sensor.

Figure 4A:
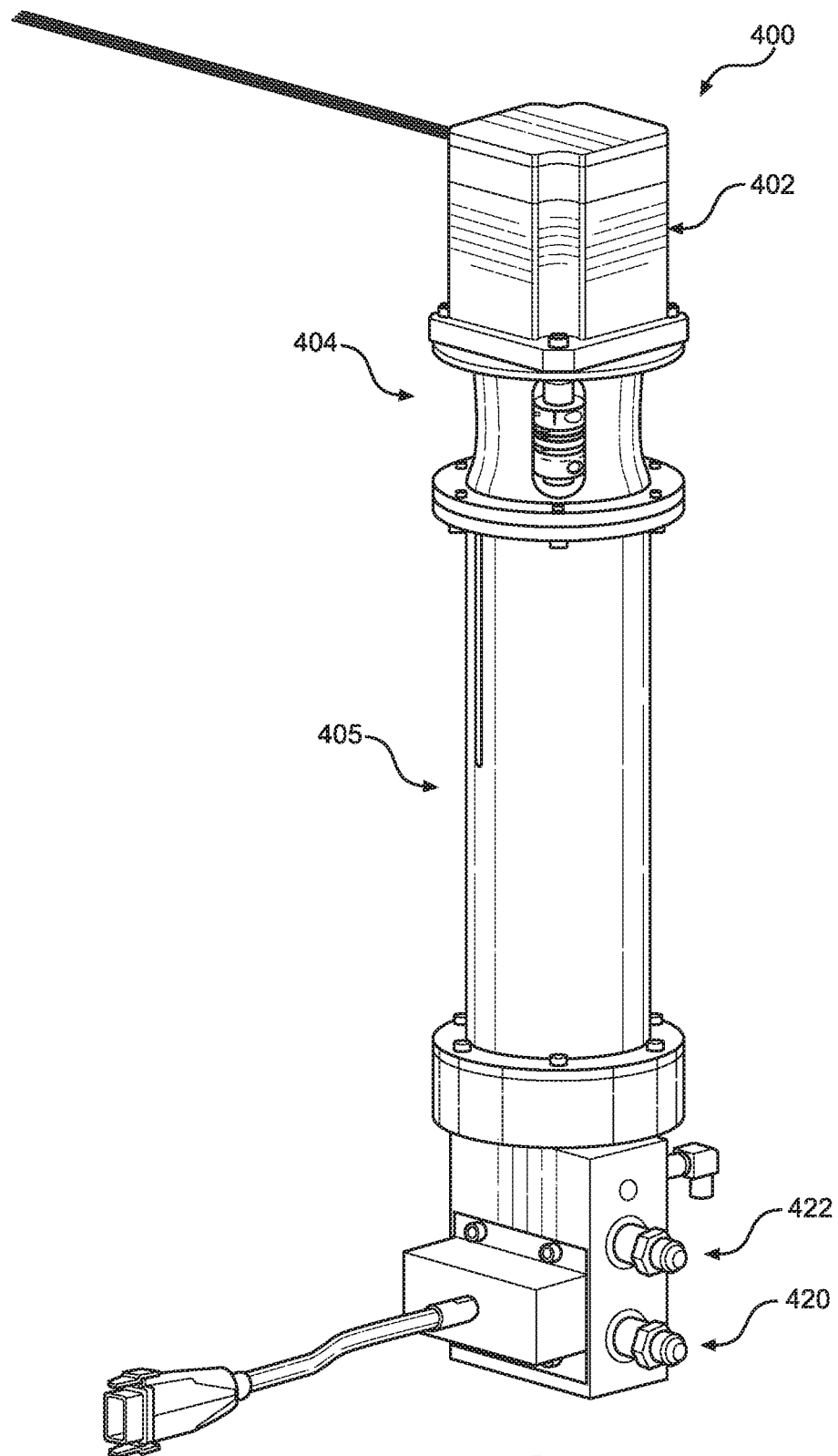
FIG. 4A is a perspective view of another embodiment of a pressure control system disclosed herein.
Figures 4B, 4C:
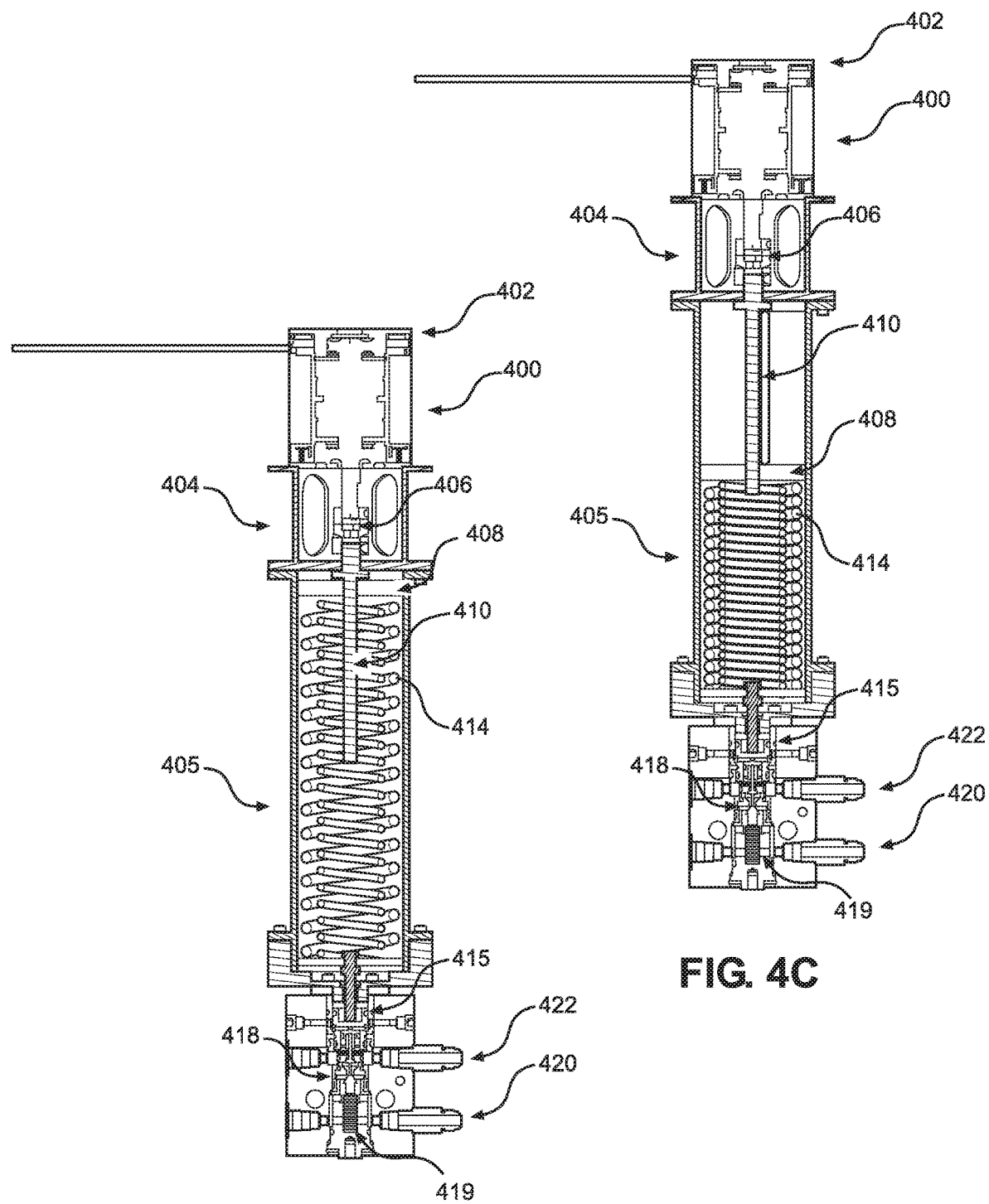
FIG. 4B is a cross-sectional view of the pressure control system shown in FIG. 4A, with the nut plate in a first position.
FIG. 4C is a cross-sectional view of the pressure control system shown in FIG. 4A, with the nut plate in a second position.
Figure 4D:
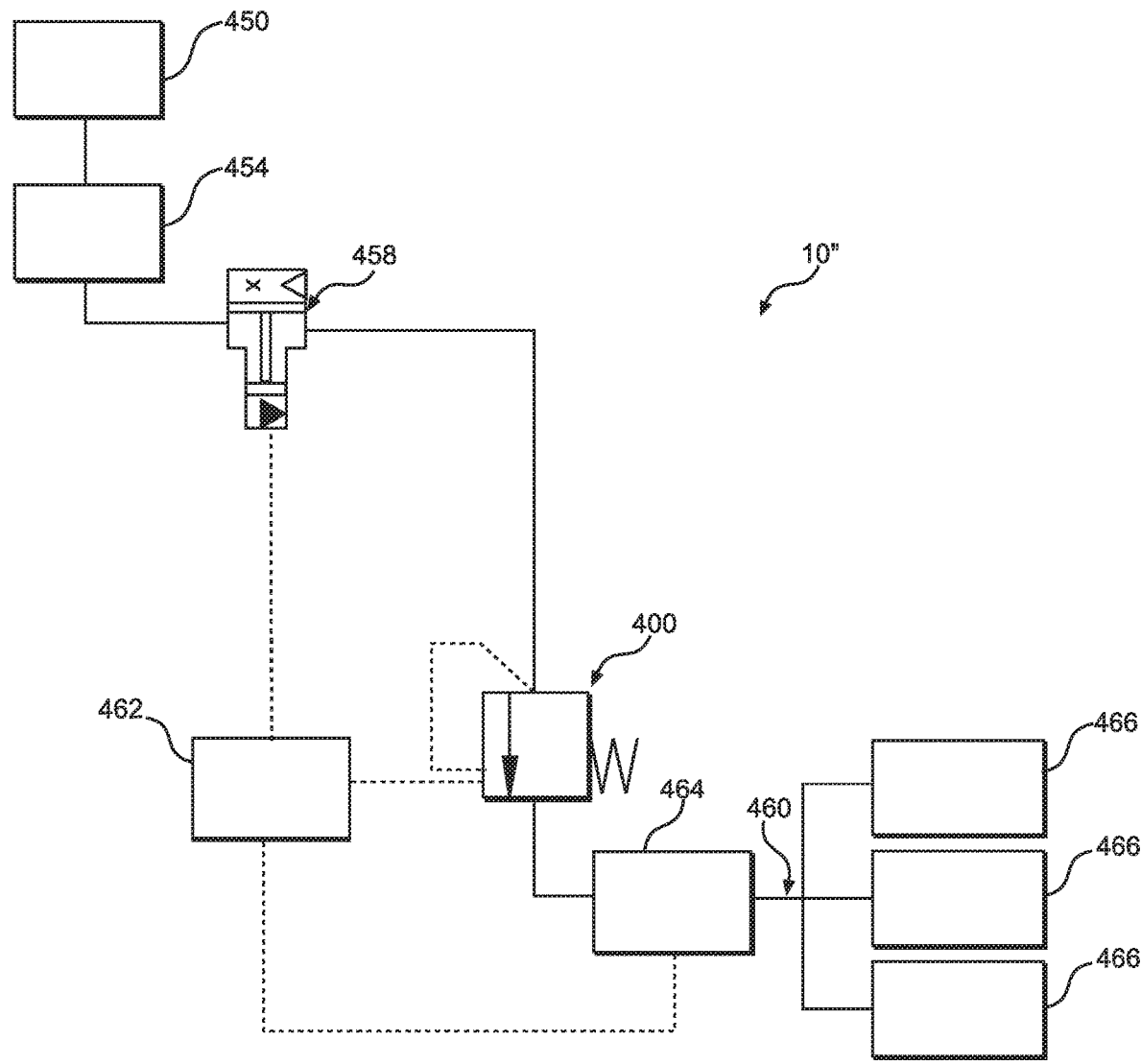
FIG. 4D is a schematic view of a hot melt dispensing system including the pressure control system shown in FIG. 4A.

Now referring to FIGS. 4A, 4B, and 4C, another embodiment of a pressure control system 400 for providing automated pressure adjustments in hot melt dispensing systems 10" is depicted. FIG. 4D illustrates a schematic diagram shown a hot melt dispensing system 10" utilizing a pressure control system 400.

The pressure control system 400 includes a motor 402 (also referred to as a drive component), a spacer assembly 404, and a regulator assembly 405. The regulator assembly 405 of the pressure control system 400 can include a coupling 406, nut plate 408, loading screw 410, spring assembly 414, a sensor assembly 415, a valve assembly 418, a spring 419, an input 420 for receiving hot melt, and an output 422 for emitting hot melt. The regulator assembly 405 and its constituent components can be configured to control the pressure of the hot melt flowing through the hot melt dispensing system 10". Specifically, the spring assembly 414 can be tensioned a certain amount to control the pressure drop of hot melt flowing from the input 420 to the output 422. Tensioning of the spring assembly 414 can be increased or decreased through actuation by the motor 402. The motor 402 can be a stepper motor or another type of motor as desired. The motor 402 can rotate the loading screw 410, which moves the nut plate 408 along an axial direction against a counter force provided by the spring assembly 414. The spring assembly 414 is thus placed under compression, and provides a desired amount of resistive force to movement of the sensor assembly 415, which is connected to the spring assembly 414 at the opposite end and can exert an upward force against the spring assembly 414 due to the force of hot melt at the output 422. FIG. 4B shows the nut plate 408 of the regulator assembly 405 at a first position, which correlates to a first pressure setting of the spring assembly 414, and FIG. 4C shows the nut plate 408 in a second position, which correlates to a second pressure setting of the spring assembly 414.

The valve assembly 418 can be connected to the sensor assembly 415 at an end opposite the spring assembly 414. The valve assembly 418 can be connected at its lower end to a spring 419, where the spring 419 is configured to provide resistance to opening of the valve 418. In operation, hot melt passes through the valve 418 from the input 420 to the output 422. When the pressure at the output 422 decreases below a setpoint as set by the position of the nut plate 408 and the bias exerted on the spring assembly 414, the sensor assembly 415 will move towards the valve assembly 418, causing valve assembly 418 to open to a greater extent, thus reducing the pressure drop from the input 420 to the output 422. Likewise, if the pressure at the output 422 increases above the setpoint, the pressure of the hot melt will force the sensor assembly 415 to move away from the valve assembly 418, causing the valve 418 to close to a greater extent, thus increasing the pressure drop from the input 420 to the output 422. To increase the pressure at the outlet, the motor 402 can rotate the loading screw 410 to move the nut plate 408 axially downwards and increase the bias on the spring assembly 414. To decrease the pressure at the outlet, the motor 402 can rotate the loading screw 410 to move the nut plate 408 axially upwards and decrease the bias on the spring assembly 414.

FIG. 4D illustrates a schematic diagram of the melter 454 and the pressure control system 400 utilized in the hot melt dispensing system 10". Though labeled differently, various elements of the hot melt dispensing system 10" can be similar to corresponding aspects of the hot melt dispensing systems 10, 10' and are described as such. The hot melt dispensing system 10" includes a hopper 450 configured to store solid material. The hopper 450 can take any number of forms, but in one embodiment the hopper 450 can include a large storage tote configured to store solid material such as pelletized adhesive for periodic delivery to the melter 454. The hot melt dispensing system 10" can include a solids pump (not shown) and a hose extending from the hopper 450 to the melter 454. The solids pump can include a pneumatic pump having an eductor and/or a venturi to move the solid material from the hopper 450 with pressurized air through the hose to the melter 454. It will be understood that the solids pump may include other types of feeding mechanisms, including non-pneumatic forms of feeding such as a mechanical agitator. The hopper 450 can be repositioned in relation to the melter 454, such as a further distance or conversely adjacent to the melter 454. In other embodiments, the hopper 450 may be an onboard component of the melter 454, such that the hopper 450 is connected to or integrated with the melter 454.

Continuing with FIG. 4D, the hopper 450 delivers the solid material to the tank disposed within the melter 454. The tank can function to store a small amount of solid material for melting on demand as needed for dispensing. A heating device disposed within the melter 454 can be configured to receive the solid material from the tank, and subsequently melt the solid material into the hot melt. In one embodiment, the heating device can include an inductor/susceptor-type heating device for rapidly melting the adhesive on demand for dispensing from the one or more applicators 466. The melter 454 can include passages for receiving the hot melt from the heating device and conveying the hot melt to various hoses. The pump 458 can be disposed within the melter 454 or external to the melter 454, and is configured to pump the supply of hot melt from the melter 454, particularly the heating device of the melter 454, through an applicator flow path 460, and to the applicators 466. The pump 458 can be a piston pump, though other types of pumps are contemplated. The applicator flow path 460 can comprise one or more hoses as desired. The applicators 466 can include any type of known applicators 466 used to dispense various types of hot melt onto a substrate. In one example, one or more of the applicators 466 can be jetting modules. As such, the applicators 466 can include respective valve members that rapidly open and close against a valve seat to rapidly jet minute droplets of the hot melt from the applicators 466. It will be appreciated that the applicators 466 can define other types of dispensing applicators, including similar and different types of contact or non-contact nozzles/modules, without departing from the scope of the invention. Though three applicators 466 are shown, the hot melt dispensing system 10" can include any number of applicators 466 as desired.

Unlike the hot melt dispensing system 10', the hot melt dispensing system 10" may include no recirculation path. As such, the pump 458 can pump the entire hot melt flow to the applicators 466 through the applicator flow path 460. The pressure control system 400 in the hot melt dispensing system 10" can be positioned in the applicator flow path 460. As a result, the pump 458 is configured to pump the hot melt to the applicators 466 through the pressure control system 400. The pressure control system 400 may include a circuit board or electronic components integrally (e.g., within the housing of the motor 402) or remotely (e.g., not physically in contact with the pressure control system 400) and be configured to control the flow of hot melt pumped by the pump 458 to the applicators 466 via the applicator flow path 460 through pressure regulation of the hot melt flowing through the applicator flow path 460. The hot melt dispensing system 10" can include a controller 462 for receiving pressure data and generating an output to the pressure control system 400 based on an input received. In embodiments, the controller 462 can comprise a feedback controller. The circuitry may also include logic for implementing, or the electronic components may also comprise memory for storing, the controller 462 for determining pressure settings based on pressure data (or other inputs) and determining motor actuation or position based on pressure settings.

In operation, the pressure control system 400 determines or receives pressure data (e.g., feedback information, feedforward information, control instructions) from itself, a pressure sensor 464, or another device or source. The pressure sensor 464 can be a device, such as a hydraulic pressure transducer, that is configured to collect pressure data on the hot melt and provide the pressure data to the controller 462. In the depicted embodiment, the pressure sensor 464 is located in the applicator flow path 460 separate from the pressure control system 400, though it is also contemplated that the pressure sensor 464 can comprise part of the pressure control system 400. Based on the pressure data, a pressure setting is determined by the controller 462. The controller 462 compares the determined pressure setting to a current or projected pressure. If the current or projected pressure deviates from the pressure setting (e.g., in any measurable amount, by more than a tolerance or threshold, or according to other comparisons), the controller 462 (or other logic) can determine an adjustment to establish the desired pressure setting in the system. As a result, the controller 462 is configured to receive the pressure data and determine a pressure setting for the hot melt based on the pressure data.

The pressure setting is described in terms of a pressure control setting, and the motor 402 of the pressure control system 400 is driven to arrange components of the regulator assembly 405, in particular the nut plate 408, to the desired setting. As such, the motor 402 can receive the pressure setting from the controller 462 and drive and/or rotate components of the regulator assembly 405 to a position associated with the pressure setting in response to the pressure data. In embodiments, feedback can be continuously received and updated by the controller 462 from the pressure sensor 464 to confirm the pressure of the hot melt responds to the control, and further adjustments can be solved for by the controller 462 and provided when the solved or target pressure is not achieved with a first adjustment. In alternative or complementary embodiments, a pressure tolerance or threshold (e.g., 0.1 bar, 0.01 bar, any other number) can be determined as a minimum adjustment. The controller 462 can compare a requested adjustment to the tolerance or threshold, and pause or reject adjustments until a solved or requested adjustment is greater than the minimum adjustment.

In other embodiments, the hot melt dispensing system 10" can include the pressure control system 200 in addition to the pressure control system 400. In such an embodiment, the pressure control system 400 can continue to be utilized to control the pressure of hot melt flowing to the applicators 466, while the pressure control system 200 can be utilized to maintain a constant pressure of the pressurized air flowing to the pump 458. As such, the pressure control system 200 can be utilized to correct any abnormalities and maintain consistency in the pressurized air provided to the pump 458.

Additionally, in other embodiments, the hot melt dispensing system 10" may not include the pressure sensor 464. In such embodiments, the controller 462 can be configured to instruct the motor to actuate so as to achieve pressure settings within the pressure control system 400 without receiving feedback from an external sensor.

While the automated pressure control systems 200, 300, 400 above are described in conjunction with certain hot melt dispensing system 10, 10', 10", these descriptions are meant to be illustrative in nature. Those of skill in the art will appreciate, on review of these disclosures, how alternative embodiments may utilize identical or similar pressure controls with, for example, pumps using piston drives, gear drives, or other drive mechanisms, or combinations thereof, without departing from the scope or spirit of the innovation. In addition, while particular form factors are shown, others can be utilized depending on implementation or aesthetic preferences.

Figure 5:
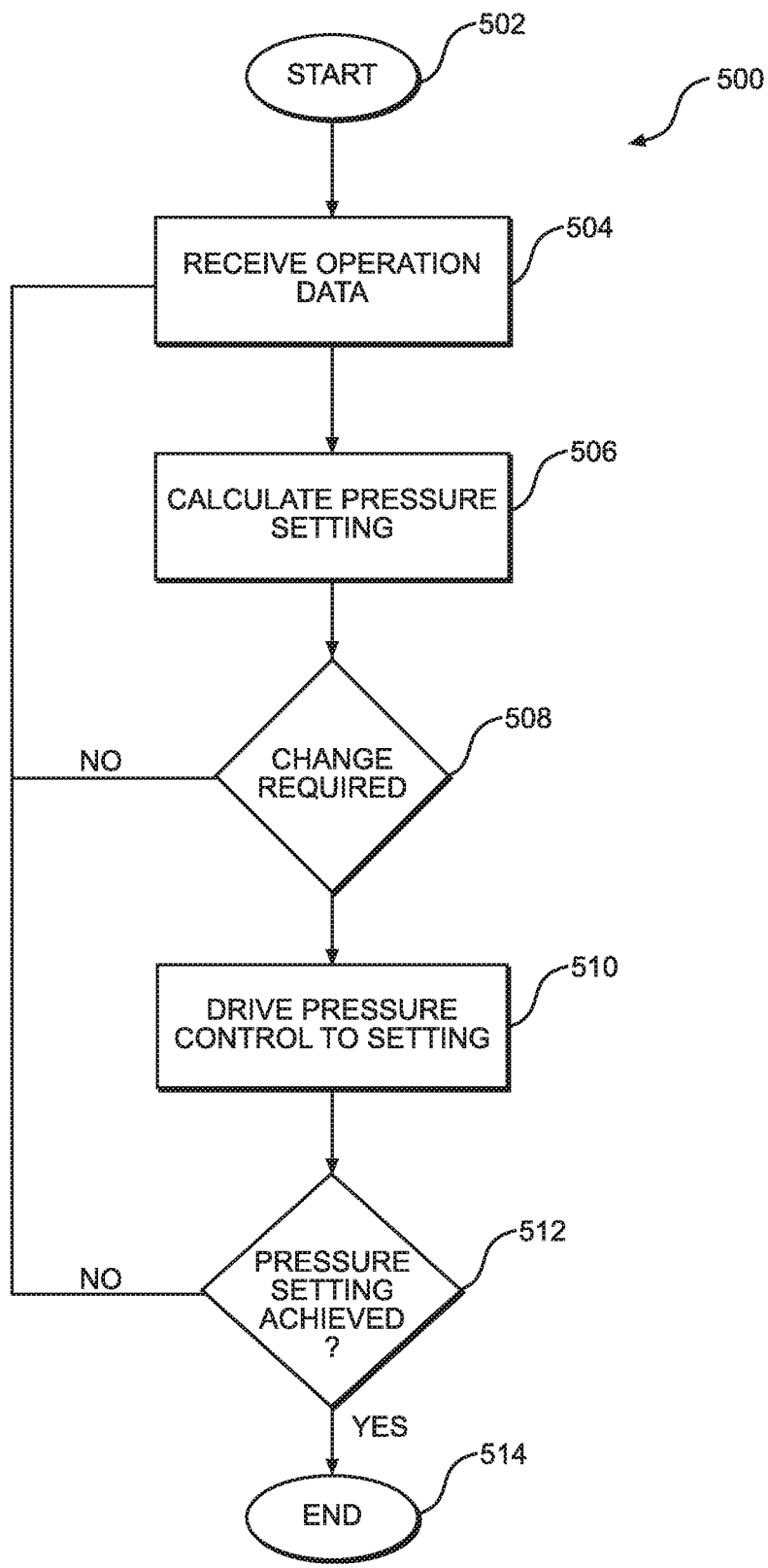
FIG. 5 is a process flow diagram for pressure control using the pressure control systems disclosed herein.

FIG. 5 illustrates an example methodology 500 for controlling pressure in hot melt dispensing system 10, 10', 10". Methodology 500 begins at 502 and proceeds to 504 where operation data is received from one or more pressure sensors 252, 364, 464, or other sources by the controller 262, 362, 462. In embodiments, operation data can include current or projected pressure data. In embodiments, additional data which informs pressure setting parameters is included in operation data. After receiving pressure data via the controller 262, 362, 462, methodology 500 proceeds to 506 where a pressure setting is calculated by the controller 262, 362, 462. The pressure setting calculated can include a physical setting (e.g., rotational or translational disposition of a pressure control element, as described above), or an electrical or electronic setting (e.g., where settings are provided through electrical or electronic systems). At 508, a determination is made by the controller 362, 462, 462 as to whether the current or projected pressure diverges from the pressure setting. If the determination at 508 returns negative, methodology 500 can return to 504 and continue monitoring operation data. In an alternative embodiment, methodology 500 can proceed to end at 514 where the determination at 508 returns negative.

If the determination at 508 returns positive, methodology 500 proceeds to 510 where a motor 202, 302, 402 of the pressure control system 200, 300, or 400 respectively, drives a component of the regulator assembly 210, 305, 405 to a position associated with the pressure setting. In an alternative embodiment, methodology 500 can then perform an additional determination as to whether the actual pressure then matches the pressure setting. If not, methodology 500 can recycle to 504 and continue making iterative adjustments. At 512, in methodology 500 the controller 262, 362, 462 can make a determination as to whether the pressure setting is achieved. If not, methodology 500 can return to 504 and continue monitoring pressure and/or remaining available to receive additional pressure commands. If the determination at 512 returns positive, methodology 500 can end at 514.

Figure 6:
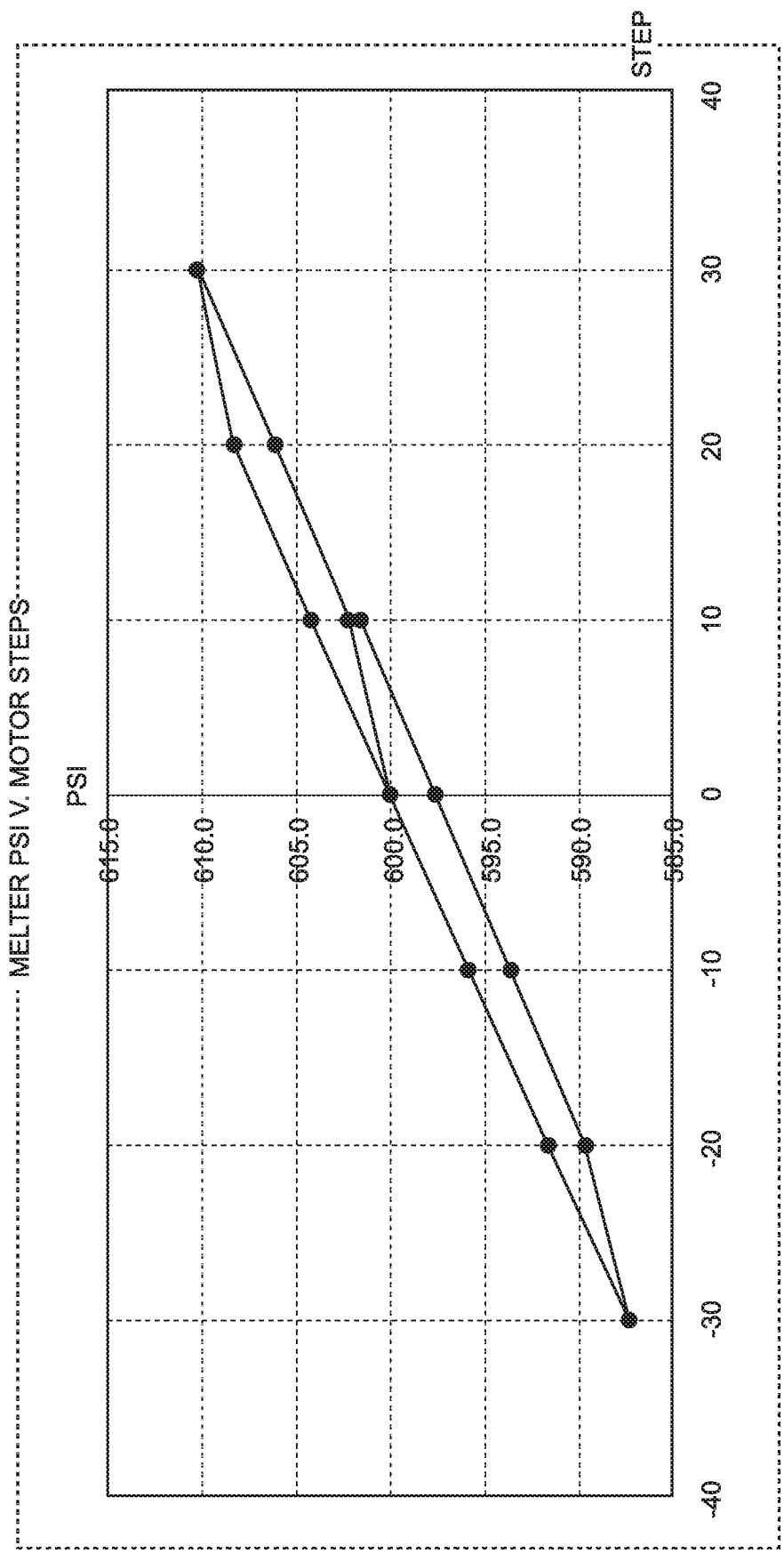
FIG. 6 is a graph of hot melt pressure in a melter versus pressure control system motor steps over a period of time according to an embodiment of the present invention.

FIG. 6 depicts a graph showing various aspects of a hot melt dispensing system 10, 10', 10" operated according to an embodiment of the present invention. In particular, the pressure of the hot melt within hot melt dispensing system 10, 10', 10" is depicted along the Y axis (in PSI), whereas the incremental steps of the motor 202, 302, 402 of the pressure control system 200, 300, 400, respectively, are shown along the X-axis. In previous pneumatically-controlled pumps, a high degree of hysteresis was a common issue due to the use of air as a driving force. However, as shown in FIG. 6, hysteresis has been significantly decreased during use of the present invention. In the depicted example, the motor 202, 302, 402 is initially offset by zero steps, and the pressure within the melter is 600 PSI. Within the context of this graph, each step can represent an incremental displacement of the driving mechanism of the motor 202, 302, 402. As the motor 202, 302, 402 is positively offset to 30 steps, the pressure within the melter increases smoothly and gradually. After displacing the motor 202, 302, 402 positively to 30 steps, the motor 202, 302, 402 is negatively offset to 30 steps. As this offset is occurring, the pressuring within the hot melt dispensing system 10, 10', 10" gradually decreases in a fairly linear and gradual manner. Further, after the motor 202, 302, 402 is negatively offset 30 steps, the motor 202, 302, 402 is then returned to a zero offset position. When this occurs, the pressure within the melter again increases, and finishes at nearly the same pressure as initially existed. As can be seen in FIG. 8, the motor 202, 302, 402 can be used within the hot melt dispensing system 10, 10', 10" to increase and decrease the pressure of hot melt within the hot melt dispensing system 10, 10', 10" in a fairly consistent and predictable manner.

While the present disclosure has been illustrated by the description of specific embodiments thereof, and while the embodiments have been described in considerable detail, it is not intended to restrict or in any way limit the scope of the appended claims to such detail. The various features discussed herein may be used alone or in any combination. Additional advantages and modifications will readily appear to those skilled in the art. The disclosure in its broader aspects is therefore not limited to the specific details, representative apparatus and methods and illustrative examples shown and described. Accordingly, departures may be made from such details without departing from the scope or spirit of the general inventive concept.

What is claimed is:

1. A hot melt dispensing system, comprising:
   a melter configured to melt solid material into hot melt;
   a pump configured to pump the hot melt from the melter to at least one applicator;
   a pressure control system configured to control a pressure of pressurized air for operating the pump, the pressure control system comprising:
      a regulator assembly configured to control the pressure of the pressurized air; and
      a drive component configured to actuate the regulator assembly;
   a pressure sensor configured to collect pressure data on the pressurized air and provide the pressure data to a controller; and
   the controller configured to determine a pressure setting for the pressurized air based on the pressure data,
   wherein the drive component is configured to receive the pressure setting from the controller and actuate the regulator assembly to a position associated with the pressure setting.

2. The hot melt dispensing system of claim 1, wherein the pressure sensor is in communication with the pressurized air between the pressure control system and the pump.

3. The hot melt dispensing system of claim 1, wherein the pressure control system further comprises a circuit board, wherein the controller is implemented on the circuit board.

4. The hot melt dispensing system of claim 1, wherein the drive component is a stepper motor.

5. The hot melt dispensing system of claim 1, wherein the drive component is configured to rotate a component of the regulator assembly.

6. The hot melt dispensing system of claim 1, wherein the pressure data is a function of an earlier pressure setting of the pressure control system.

7. The hot melt dispensing system of claim 1, further comprising:
   the at least one applicator configured to dispense the hot melt onto to a substrate.

8. The hot melt dispensing system of claim 7, wherein the at least one applicator comprises a plurality of applicators.

9. The hot melt dispensing system of claim 7, wherein the pump is configured to pump the hot melt to the at least one applicator through the pressure control system.

10. The hot melt dispensing system of claim 9, further comprising:
    a flow divider configured to receive the hot melt from the pump and split the hot melt between an applicator path that extends to the at least one applicator and a recirculation path that includes the pressure control system and recirculates the hot melt to the pump.

11. The hot melt dispensing system of claim 1, wherein the regulator assembly comprises:
    a needle;
    a spring configured to exert a downward force on the needle;
    a piston configured to bias the spring; and
    a seat, wherein the needle is configured to move upwards against the downward force of the spring under an upwards force applied by the hot melt as the hot melt flows between the needle and the seat,
    wherein the position associated with the pressure setting is a vertical position of the piston, such that the piston applies a load having a predetermined magnitude onto the spring.

12. The hot melt dispensing system of claim 1, wherein the regulator assembly comprises:
    an input;
    an output;
    a spring assembly;
    a nut plate configured to selectively bias the spring assembly so as to adjust a pressure setpoint of the spring assembly;
    a sensor assembly operably attached to the spring assembly; and
    a valve assembly operably attached to the sensor assembly and configured to control a pressure drop of the hot melt flowing from the input to the output,
    wherein the valve assembly is configured to further open when the pressure of the hot melt at the output decreases below the pressure setpoint of the spring assembly so as to move the sensor assembly in a first direction, and the valve assembly is configured to further close when the pressure of the hot melt at the output increases above the pressure setpoint of the spring assembly so as to move the sensor assembly in a second direction opposite the first direction.

13. A hot melt dispensing system, comprising:
a melter configured to melt solid material into hot melt;
a pump configured to pump the hot melt from the melter to at least one applicator;
a pressure control system configured to control a pressure of pressurized air for operating the pump, the pressure control system comprising:
  a regulator assembly configured to control the pressure of the pressurized air; and
  a stepper motor configured to actuate the regulator assembly; and
a controller configured to determine a pressure setting for the pressurized air,
wherein the stepper motor is configured to receive the pressure setting from the controller and actuate the regulator assembly to a position associated with the pressure setting.

14. The hot melt dispensing system of claim 13, wherein the stepper motor is configured to rotate a component of the regulator assembly.

15. The hot melt dispensing system of claim 13, further comprising the at least one applicator configured to dispense the hot melt onto to a substrate.

16. A hot melt dispensing system, comprising:
a melter configured to melt solid material into hot melt;
a pump configured to pump the hot melt from the melter to at least one applicator;
a pressure control system configured to control a pressure of pressurized air for operating the pump, the pressure control system comprising:
  a regulator assembly configured to control the pressure of the pressurized air; and
  a drive component configured to rotate a component of the regulator assembly; and
a controller configured to determine a pressure setting for the pressurized air,
wherein the drive component is configured to receive the pressure setting from the controller and actuate the regulator assembly to a position associated with the pressure setting.

17. The hot melt dispensing system of claim 16, further comprising the at least one applicator configured to dispense the hot melt onto to a substrate.

18. The hot melt dispensing system of claim 17, wherein the at least one applicator comprises a plurality of applicators.

19. A hot melt dispensing system, comprising:
a melter configured to melt solid material into hot melt;
at least one applicator configured to dispense the hot melt onto to a substrate;
a pump configured to pump the hot melt from the melter to the at least one applicator;
a pressure control system configured to control a pressure of pressurized air for operating the pump, the pressure control system comprising:
  a regulator assembly configured to control the pressure of the pressurized air; and
  a drive component configured to actuate the regulator assembly; and
a controller configured to determine a pressure setting for the pressurized air,
wherein the drive component is configured to receive the pressure setting from the controller and actuate the regulator assembly to a position associated with the pressure setting, and
wherein the pump is configured to pump the hot melt to the at least one applicator through the pressure control system.

20. The hot melt dispensing system of claim 19, wherein the at least one applicator comprises a plurality of applicators.

* * * * *